Sept. 22, 1953
J. H. MORENO
2,652,768
COOKING PAN
Filed July 9, 1951
2 Sheets-Sheet 1
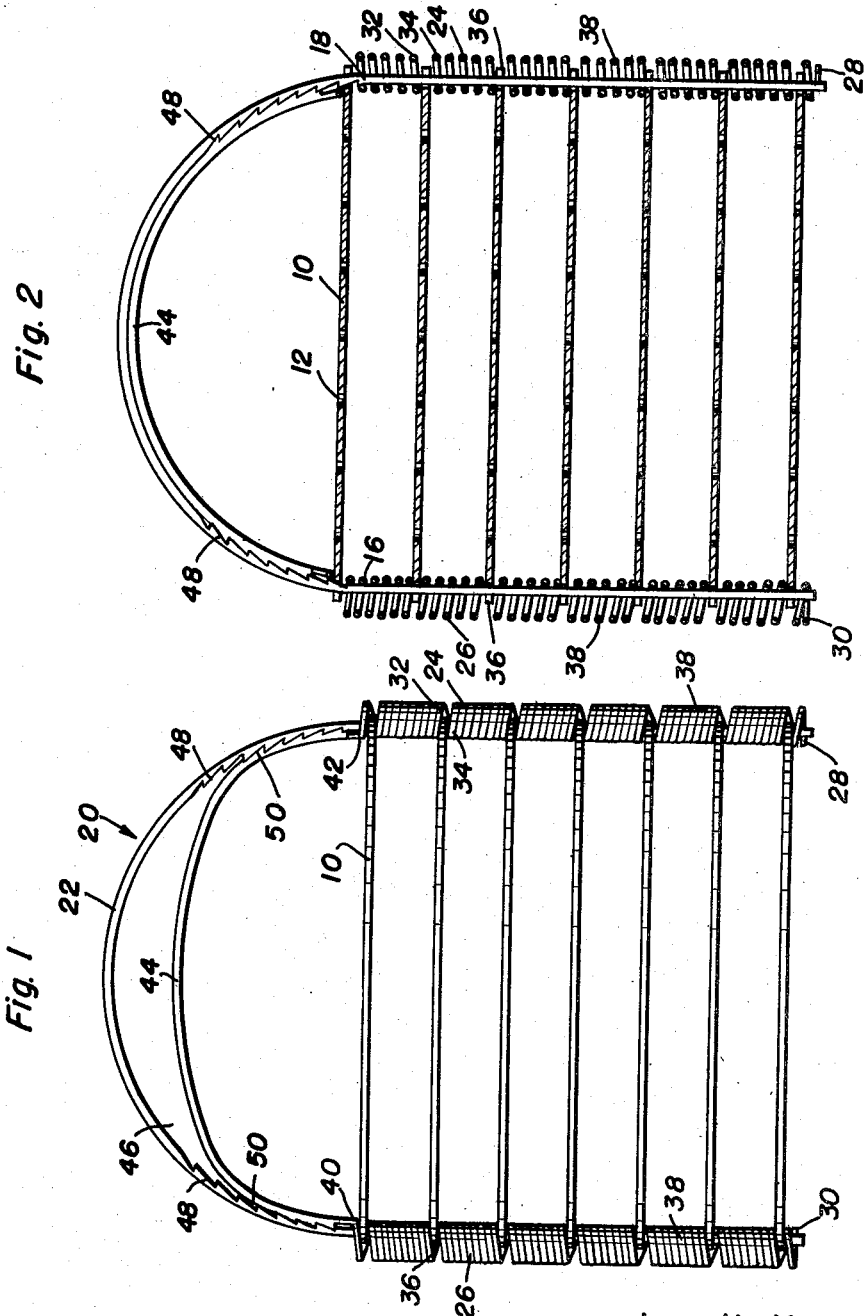
Jose H. Moreno
INVENTOR.
BY

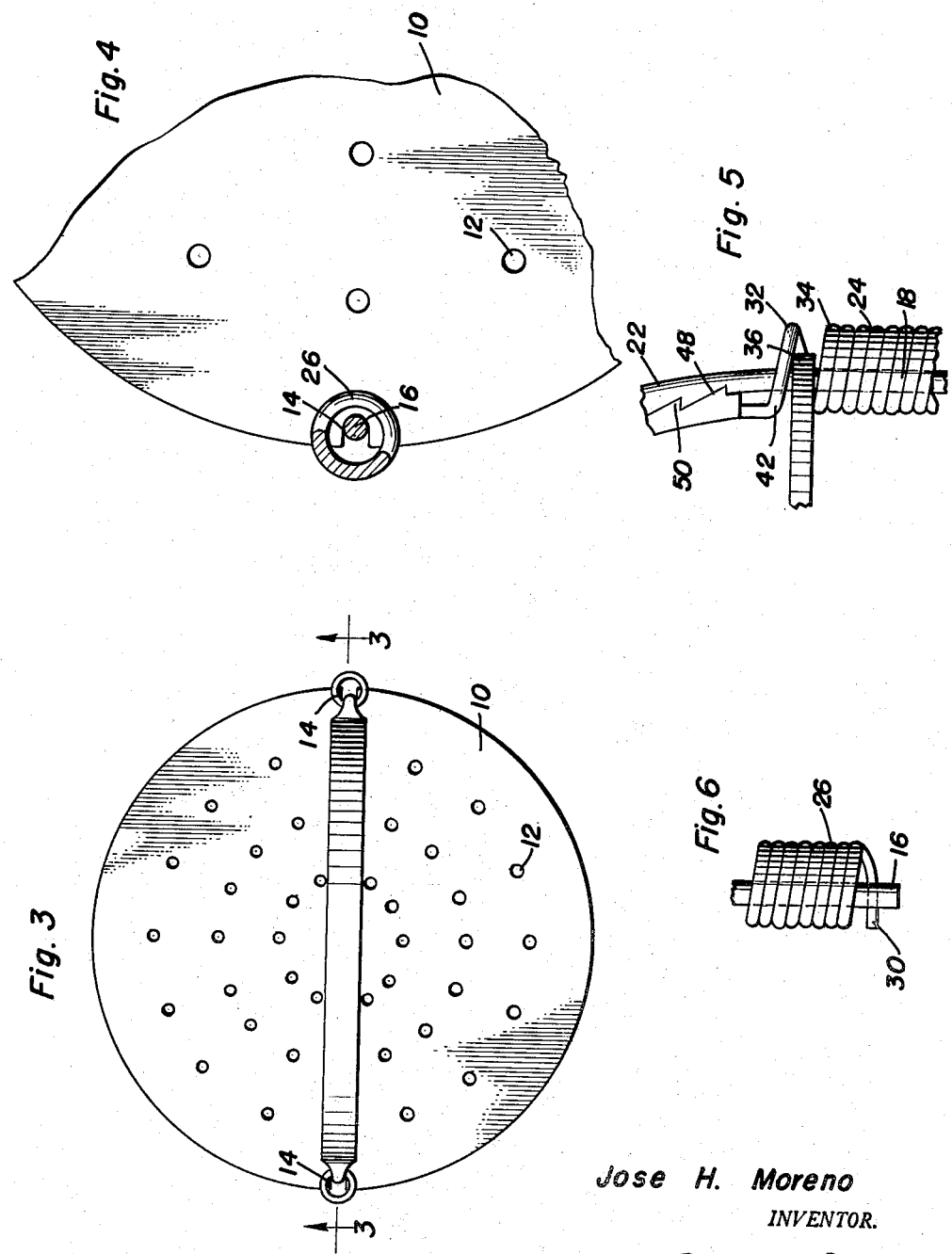

Patented Sept. 22, 1953

2,652,768

UNITED STATES PATENT OFFICE 2,652,768

COOKING PAN

José H. Moreno, San Pedro, Calif.

Application July 9, 1951, Serial No. 235,796

4 Claims. (Cl. 99—417)

This invention relates to a three way cooking pan, the primary object of which is to enable the cook to prepare different and large amounts of food at the same time.

An important object of this invention is to provide a pan having sections or partitions between which food may be placed to enable many layers of food or meat to be fried, boiled or roasted over a small portion of a stove or oven.

A further object of this invention is to provide a three way cooker of the character described in which spaced partitions are employed between which food may be retained during the cooking process, which plates are perforated to allow all black particles to settle to the bottom of the pan and also to serve for basting purposes. The construction is such that the spacing between the plates may be readily and evenly adjusted by means of a simple manipulation and the cooking process can be carried out without the necessity for continuously watching the food or turning it over to cook the food thoroughly. The device is applicable for the preparation not only of meats but vegetables and all kinds of paste food and Spanish dishes such as tortillas, tacos, and enchiladas, etc.

These, together with various ancillary objects and features of the invention which will later become apparent as the following description proceeds, are attained by the device, a preferred embodiment of which has been illustrated by way of example only in the accompanying drawings, wherein:

Figure 1 is a top plan of the device;

Figure 2 is a side elevational view of the device;

Figure 3 is a view similar to Figure 2 while illustrating the manner of adjusting the space apart position of the perforate plate and taken on line 3—3 of Figure 1;

Figure 4 is an enlarged fragmentary horizontal sectional view through one of the legs and springs and between the plate;

Figure 5 is an enlarged elevational view of the upper portion of one of the springs and illustrating a portion of the adjustable retaining means; and Figure 6 is an enlarged elevational view of the bottom portion of one of the springs and illustrating the manner in which it is connected to one of the legs of the bail.

Specific reference is now made to the drawings. In the several views in the accompanying drawings and in the following specification reference characters indicate corresponding elements throughout.

The device comprises a plurality of supporting plates 10 having apertures or perforations 12 serving as drainage ports for basting fluid and also for allowing black particles produced in frying or roasting of meat to drop to the bottom of the pan. The plates may be of any shape, although preferably circular, and are retained in a spaced apart position as will be explained hereinafter, the diametrically opposed edges of each plate being provided with notches or cut-out portions 14 for receiving the spaced apart legs 16 and 18 of a U-shaped bail 20, the latter including a flattened web portion 22 integral with the upper ends of the leg portions 16 and 18.

A pair of coil springs 24 and 26 are provided which are wound about each of the legs 16 and 18 and include lower free end portions 28 and 30 which are secured to the lower free ends of the legs 16 and 18 by passing through suitable apertures in the legs as shown clearly in the drawings. Along the length of each spring at spaced points, several adjacent convolutions 32 and 34 are separated to receive the diametrically opposed end portions 36 of each of the plates 10 as shown in the drawings and more particularly in Figure 5. Thus it will be seen that along the lengths of each of the springs 24 and 26 there is a plurality of coil sections 38 which serve as resilient spacers for the plates.

The upper ends of the springs extend inwardly of the web 22 as at 40 and 42 and are either secured to or integral with an arcuate rod 44 retained within the confines of the web 22 of the U-shaped bail 20. In this connection, it will be noted that the arc of the rod 44 is smaller than that of the web 22 leaving normally a space 46 between the two members. At diametrically opposite positions, the web 22 adjacent its connection with the legs 16 and 18 is provided at its inner surface with inclined teeth 48 whereas the rod 44 at diametrical positions is provided adjacent its connection with the upper ends of the openings at its outer surface with similarly inclined teeth 50 engaging the said teeth 48. To adjust the spacing between the plates 10, the web 22 and rod 44 are grasped in the hand and pressed together to reduce the space 46 whereupon tension is transmitted to the coil sections 38 to expand them and move the plates apart, the selective engagement between the web teeth 48 and rod teeth 50 retaining the adjusted spacing as shown clearly in Figure 3 in comparison to the illustration in Figure 2. The flexibility of the web and rod allow separation of these members when needed.

By adjusting the spacing of the plates and placing food items therebetween, the device can be used to fry, boil or roast many and, if desired, different kinds of foods without requiring turning or constant watching. The plates can be spaced apart for access to the prepared food items by a simple squeezing of the web and rod.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described my invention, what is claimed as new is:

1. A cooking apparatus comprising a plurality of vertically spaced perforated plates, a U-shaped bail having spaced legs interconnected by a web, said legs straddling said plates, resilient means carried by said legs and maintaining said plates spaced apart, and means operatively connected to said web for adjusting the space between said plates and acting against said resilient means, said means operatively connected to said web including an arcuate rod disposed within the confines of said web and terminally secured to the upper ends of said resilient means, and means for releasably retaining said rod in adjusted positions on said web, said releasable retaining means including spaced, inclined teeth in the inner surface of said web adjacent said legs and spaced similarly inclined teeth in the outer surface of said rod adjacent said springs and engaging said web teeth.

2. The combination of claim 1 wherein said resilient means includes a pair of coil springs each wound about each leg and secured at its lower end to the lower end of each leg, the end portions of said plates being received between adjacent convolutions at spaced points along the length of each spring.

3. The combination of claim 1 and notches through the end portions of each plate receiving said legs.

4. A cooking apparatus comprising a plurality of vertically spaced plates, a U-shaped bail having spaced legs interconnected by a web, resilient means carried by each of said legs and maintaining said plates in spaced apart relation, a rod connecting the upper ends of said resilient means to one another and being disposed within the confines of said web, cooperating means on said bail and said rod for adjustably varying the spacing between said plates, said cooperating means including spaced teeth in the inner surface of said web adjacent said legs and spaced teeth in the outer surface of said rod engaging said web teeth.

JOSÉ H. MORENO.

References Cited in the file of this patent

UNITED STATES PATENTS

| Number | Name | Date |
|---|---|---|
| 519,580 | Kelsey | May 8, 1894 |
| 745,196 | King | Nov. 24, 1903 |
| 979,388 | Ericson | Dec. 20, 1910 |
| 1,618,675 | Quigley | Feb. 22, 1927 |
| 1,985,115 | Offenhauser | Jan. 1, 1935 |

FOREIGN PATENTS

| Number | Country | Date |
|---|---|---|
| 154,317 | Great Britain | Nov. 23, 1920 |